United States Patent
Zhang (10) Patent No.: US 9,918,332 B2
(45) Date of Patent: Mar. 13, 2018

(54) METHOD AND DEVICE FOR UE-BASE STATION COMMUNICATION BY USING UNLICENSED SPECTRUM

(71) Applicant: Shanghai Langbo Communication Technology Company Limited, Shanghai (CN)

(72) Inventor: XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 15/501,732

(22) PCT Filed: Jul. 24, 2015

(86) PCT No.: PCT/CN2015/085031
§ 371 (c)(1),
(2) Date: Feb. 3, 2017

(87) PCT Pub. No.: WO2016/019813
PCT Pub. Date: Feb. 11, 2016

(65) Prior Publication Data
US 2017/0230990 A1 Aug. 10, 2017

(30) Foreign Application Priority Data
Aug. 6, 2014 (CN) .......................... 2014 1 0384347

(51) Int. Cl.
H04W 72/00 (2009.01)
H04W 72/12 (2009.01)
(Continued)

(52) U.S. Cl.
CPC ....... *H04W 72/1205* (2013.01); *H04L 1/1812* (2013.01); *H04W 16/14* (2013.01); *H04W 72/0453* (2013.01); *H04W 74/006* (2013.01)

(58) Field of Classification Search
CPC ......... H04W 72/1205; H04W 72/0453; H04W 16/14; H04W 74/006; H04L 1/1812
(Continued)

(56) References Cited

U.S. PATENT DOCUMENTS

2012/0063373 A1 3/2012 Chincholi et al.
2014/0341018 A1* 11/2014 Bhushan ........... H04W 28/0289
370/230

(Continued)

FOREIGN PATENT DOCUMENTS

CN 102232307 A 11/2011
CN 103069882 A 4/2013
CN 103517456 A 1/2014

OTHER PUBLICATIONS

Zhou, Dan; International Search Report and Written Opinion; International Application No. PCT/CN2015/085031; dated Oct. 29, 2015; State Intellectual Property Office of The P.R. China; Beijing, China.

(Continued)

Primary Examiner — Khai M Nguyen
(74) Attorney, Agent, or Firm — Perkins Coie LLP (57) ABSTRACT

Provided are a method and device for UE-base station communication by using an unlicensed spectrum, the method comprising: a UE detects, on the first sub frame of a first carrier wave, a first physical layer signaling for scheduling the first carrier wave, and detects, on the second sub frame of a second carrier wave, a second physical layer signaling for scheduling the first carrier wave, the first carrier being deployed on the unlicensed spectrum, the second carrier wave being deployed on a licensed spectrum, (Continued)

and the first sub frame and the second sub frame being different sub frames. The present invention disclosure ensures the transmission quality of the physical layer signaling as far as possible, and also ensures that a sub frame on an SCC can be scheduled. In addition, the present invention disclosure reuses an existing LTE CA solution as far as possible, and has good compatibility.

10 Claims, 2 Drawing Sheets

(51) Int. Cl.
*H04W 16/14* (2009.01)
*H04W 72/04* (2009.01)
*H04W 74/00* (2009.01)
*H04L 1/18* (2006.01)

(58) Field of Classification Search
USPC ...................................... 455/454, 456.1, 450
See application file for complete search history.

(56) References Cited

U.S. PATENT DOCUMENTS

| 2015/0103715 | A1* | 4/2015 | Chen ..................... H04L 5/0044 370/311 |
| 2015/0103777 | A1* | 4/2015 | Chen ..................... H04L 5/0044 370/329 |
| 2015/0365209 | A1* | 12/2015 | Yi ........................... H04L 5/001 370/329 |
| 2016/0295526 | A1* | 10/2016 | Park .................... H04W 52/325 |
| 2017/0215082 | A1* | 7/2017 | Hwang ................ H04W 16/14 |

OTHER PUBLICATIONS

Lingfei Bai; International Preliminary Report on Patentability; International Application No. PCT/CN2015/085031; dated Feb. 7, 2017; International Bureau of WIPO; Geneva, Switzerland.

* cited by examiner

METHOD AND DEVICE FOR UE-BASE STATION COMMUNICATION BY USING UNLICENSED SPECTRUM

CROSS-REFERENCE TO RELATED APPLICATION

This application is a U.S. National Phase application under 35 U.S.C. § 371 of International Application No. PCT/CN2015/085031, filed on Jul. 24, 2015, and claims benefit to Chinese Patent Application No. CN 201410384347.0, filed on Aug. 6, 2014, all of which is hereby incorporated by reference for all purposes. The International Application was published in China on Feb. 11, 2016 as WO 2016019713 A1 under PCT Article 21 (2).

BACKGROUND

Technical Field

The present disclosure is related to a scheme adopting an unlicensed spectrum communication in a wireless communication system, and more particular to a communication method and device for an unlicensed spectrum based on Long Term Evolution (LTE).

Related Art

3rd Generation Partner Project (3GPP) defines a time division duplex (TDD) frame structure in a LTE system, as shown in Table 1, wherein D indicates a downlink sub frame, U indicates an uplink sub frame, and S is a special sub frame.

Table 1: TDD LTE Frame Structure.

| TDD frame structure | Downlink-uplink switching point period | Sub frame index number | | | | | | | | | |
|---|---|---|---|---|---|---|---|---|---|---|---|
| | | 0 | 1 | 2 | 3 | 4 | 5 | 6 | 7 | 8 | 9 |
| #0 | 5 ms | D | S | U | U | U | D | S | U | U | U |
| #1 | 5 ms | D | S | U | U | D | D | S | U | U | D |
| #2 | 5 ms | D | S | U | D | D | D | S | U | D | D |
| #3 | 10 ms | D | S | U | U | U | D | D | D | D | D |
| #4 | 10 ms | D | S | U | U | D | D | D | D | D | D |
| #5 | 10 ms | D | S | U | D | D | D | D | D | D | D |
| #6 | 5 ms | D | S | U | U | U | D | S | U | U | D |

R (Release) 12 of 3GPP introduces an enhanced interference management traffic adaptation (eIMTA) technique. That is for the TDD frame structure, it is capable of adjusting the TDD frame structure through a dynamic signaling. The possible TDD frame structure includes seven TDD frame structures #0-#6 defined by the LTE.

In a traditional 3GPP LTE system, data transmission may only occur on a licensed spectrum. However, with the sharp increase on the communication amount, especially in some urban areas, it may be difficult for the licensed spectrum to meet the requirement of the communication amount. 3GPP RAN (Radio Access Network) #62 meeting discussed a new research topic, i.e. a research of the unlicensed spectrum (RP-132085). The main purpose is to research the use of a non-standalone deployment of LTE on the licensed spectrum. The so-called non-standalone means that the communication on the unlicensed spectrum is associated with a serving cell on the licensed spectrum. An intuitive method is to reuse a concept of a carrier aggregation (CA) in the existing system as much as possible, i.e. a serving cell deployed on the licensed spectrum serves as PCC (Primary Component Carrier), and a serving cell deployed on the unlicensed spectrum serves as SCC (Secondary Component Carrier). The CA includes traditional TDD CA, FDD (Frequency Division Duplex) CA and FDD-TDD CA introduced by 3GPP R12. In RAN #64 meeting (seminar), the communication on the unlicensed spectrum is uniformly named as LAA (License Assisted Access).

For LAA, the mainstream of the application scenario is a small cell communication, i.e. the small cell supports the PCC deployed on the licensed spectrum and the SCC deployed on the unlicensed spectrum at the same time, and a macrocell supports the PCC deployed on the licensed spectrum. Compared to the licensed spectrum, it is more difficult to predict/control the interference on the unlicensed spectrum. Therefore, one viable method is that the control signaling is transmitted on the PCC and the data is transmitted on the SCC. However, the above method has the following problem.

For the small cell, the technique, such as eICIC (enhanced Inter Cell Interference Cancellation) or FeICIC (Further eICIC) and so on, makes the small cell only transmit PDCCH (Physical Downlink Control Channel) and PDSCH (Physical Downlink Control Channel) on the specific sub frame of the PCC, so as to avoid the interference with the macro cell. In the sub frame without transmitting the PDCCH, the small cell may not schedule the SCC.

If the PCC of the small cell adopts the traditional TDD or TDD eIMTA, the sub frame of the SCC corresponding to the uplink sub frame of the PCC may not be scheduled.

For the above problem, the present disclosure provides a communication method and device on an unlicensed spectrum in a UE and a base station.

SUMMARY

The present disclosure discloses a method adopting an unlicensed spectrum communication in a user equipment (UE), which includes the following steps:

step A: detecting a first physical layer signaling for scheduling a first carrier on a first sub frame of the first carrier, and detecting a second physical layer signaling for scheduling the first carrier on a second sub frame of a second carrier;

wherein the first carrier is deployed on an unlicensed spectrum, the second serving cell is deployed on a licensed spectrum, the first sub frame and the second frame are two different sub frames, and for the UE, the first carrier can be self-scheduled and cross-carrier scheduled.

The essence of the above aspect is that for the UE, the unlicensed spectrum simultaneously supports a self-scheduling and a cross carrier scheduling. In one embodiment, the physical layer signaling is one of DCI (Downlink Control Information) formats {1, 1A, 1B, 1C, 1D, 2, 2A, 2B, 2C, 2D}. In one embodiment, the physical layer signaling is one of the DCI formats {0, 4}.

Specifically, according to an aspect of the present disclosure, the step A further includes the following steps:

step A0: receiving a downlink signaling, so as to determine to detect the first physical layer signaling on the first sub frame of the first carrier.

In one embodiment, the downlink signaling is SIB (System Information Block) 1, and the SIB 1 is configured with a TDD frame structure of the second carrier, wherein the first sub frame corresponds to an uplink sub frame. In one embodiment, the downlink signaling is a physical layer signaling with the TDD frame structure of the second carrier identified by eIMTA-RNTI (Radio Network Temporary Identifier), wherein the first sub frame corresponds to the uplink sub frame. In one embodiment, the downlink signaling is a RRC (Radio Resource Control) signaling, and the RRC signaling adopts a bitmap manner to configure whether the UE detects the first physical layer signaling in each sub frame of the first carrier. In one embodiment, the downlink signaling is subframePatternConfig-r11 IE (Information Element), it indicates ePDCCH (enhanced PDCCH) detecting sub frame set, and the first sub frame belongs to the ePDCCH detecting sub frame set.

Specifically, according to an aspect of the present disclosure, the step A further includes the following step:

step A1: detecting a PCFICH (Physical control format indicator channel) on a first sub frame of the second carrier, so as to determine that the PCFICH does not exist;

wherein the first sub frame is a sub frame except a sub frame set of ePDCCH detected by the UE on the second carrier. That is, the UE does not detect the ePDCCH on the first sub frame of the second carrier.

The essence of the above aspect is that a control signaling for scheduling an unlicensed carrier is preferentially transmitted on a licensed carrier. Only in the uplink sub frame of the licensed carrier or the sub frame of the PDCCH does not be transmitted, the control signaling is transmitted on the unlicensed carrier.

Specifically, according to an aspect of the present disclosure, the method further includes the following steps:

step B: receiving a downlink physical layer data according to the first physical layer signaling; and step C: transmitting a HARQ (Hybrid Automatic Repeat Request)_ACK (Acknowledge) for the downlink physical layer data on a serving cell belonged to the second carrier;

wherein the serving cell belonged to the second carrier is a primary cell, the first sub frame is a latest downlink sub frame in the downlink sub frame indicated by the HARQ_ACK, the UE detects and gets the first physical layer signaling in the first sub frame, a generating parameter of PUCCH resource occupied by the HARQ_ACK includes a first index. The first index is an index of a first CCE (Control Channel Element) occupied by the first physical layer signaling in PDCCH (Physical Downlink Control Channel) of the first sub frame of the first carrier, or an index of a first eCCE (enhanced CCE) occupied by the first physical layer signaling in a corresponding EPDCCH-PRB-set. The EPDCCH-PRB-set is used to a PRB resource of the EPDCCH, and the specific introduction thereof refers to TS36.213.

The HARQ_ACK indicates whether the downlink physical layer data is correctly received. For the TDD, the HARQ_ACK may further indicate whether the downlink data of other sub frames except the first sub frame is correctly received.

The essence of the above aspect is that a mapping method similar to transmitting CCE/eCCE occupied by the DCI to the PUCCH resource by the primary cell in LTE is adopted to determine the mapping of the CCE/eCCE occupied by the first physical layer signaling to the PUCCH. Since PUCCH/ePUCCH does not exist in the first sub frame on a second serving cell, the PUCCH resource reserved for the second serving cell is capable of indicating the downlink sub frame on the first carrier, thereby saving the PUCCH resource.

In one embodiment, the primary cell is a TDD cell, and the first sub frame is a latest downlink sub frame in the downlink sub frames indicated by the HARQ_ACK. In one embodiment, the primary cell is a FDD (Frequency Division Duplex) cell, and the first sub frame is a unique downlink sub frame indicated by the HARQ_ACK. In one embodiment, the PUCCH occupied by the HARQ_ACK is co-determined by the first index and parameters of a higher layer configuration. In one embodiment, the first index is the index of the first CCE occupied by the first physical layer signaling in PDCCH of the first sub frame of the first carrier, the mapping relationship of the PUCCH occupied by the HARQ_ACK and the first index reuses the mapping relationship of the PUCCH to the PUCCH resource of the primary cell in the existing LTE system except $n_{CCE,m}$ replacing as the first index. In one embodiment, the first index is the index of the first eCCE occupied by the first physical layer signaling in the corresponding EPDCCH-PRB-set and the mapping relationship of the PUCCH occupied by the HARQ_ACK and the first index reuses the mapping relationship of the PUCCH to the PUCCH resource of the primary cell in the existing LTE system except $n_{ECCE,q}$ replacing as the first index and the related parameter of the EPDCCH-PRB-set replacing as the related parameter of the corresponding EPDCCH-PRB-set. $n_{CCE,m}$ and $n_{ECCE,q}$ are indexes of CCE and eCCE respectively, and the specific description thereof refers to TS 36.213.

The present disclosure discloses a method adopting an unlicensed spectrum communication in a base station, which includes the following steps:

Step A: transmitting a first physical layer signaling for scheduling a first carrier on a first sub frame of the first carrier, and transmitting a second physical layer signaling for scheduling the first carrier on a second sub frame of a second carrier;

wherein the first carrier is deployed on an unlicensed spectrum, the second serving cell is deployed on a licensed spectrum, the first sub frame and the second frame are two different sub frames, target UEs of the first physical layer signaling and the second physical layer signaling are an identical UE, and for the UE, the first carrier can be self-scheduled and cross-carrier scheduled.

In one embodiment, the first physical layer signaling and the second physical layer signaling are identified by the same C-RNTI (Cell RNTI).

Specifically, according to an aspect of the present disclosure, the step A further includes the following steps:

step A0: transmitting a downlink signaling, so as to indicate the target UE to detect the first physical layer signaling on the first sub frame of the first carrier.

In one embodiment, the downlink signal is SIB1 and the SIB 1 is configured with a TDD frame structure of the second carrier, wherein the first sub frame corresponds to an uplink sub frame. In one embodiment, the downlink signaling is a physical layer signaling with the TDD frame structure of the second carrier identified by eIMTA-RNTI, wherein the first sub frame corresponds to the uplink sub frame. In one embodiment, the downlink signaling is a RRC signaling, and the RRC signaling adopts a bitmap manner to configure whether the UE detects the first physical layer signaling in each sub frame of the first carrier. In one embodiment, the downlink signaling is subframePatternConfig-r11 IE (Information Element), it indicates ePDCCH detecting sub frame set, and the first sub frame belongs to the ePDCCH detecting sub frame set. The subframePatternConfig-r11 IE is used for indicating a higher layer signaling of a time domain resource, and the specific description thereof refers to TS36.331.

Specifically, according to an aspect of the present disclosure, the step A further includes the following step:

step A1: determining a zero transmitting power maintained on PCFICH of a first sub frame of the second carrier;

wherein the first sub frame is a sub frame except a sub frame set of ePDCCH detected by the UE on the second carrier. That is, the UE does not detect ePDCCH on the first sub frame of the second carrier.

Specifically, according to an aspect of the present disclosure, the method further includes the following step:

step B: transmitting a downlink physical layer data according to the first physical layer signaling; and step C: receiving a HARQ_ACK for the downlink physical layer data on a serving cell belonged to the second carrier;

wherein the serving cell belonged to the second carrier is a primary cell, the first sub frame is a latest downlink sub frame in the downlink sub frame indicated by the HARQ_ACK, a generating parameter of PUCCH resource occupied by the HARQ_ACK includes a first index; the first index is an index of a first CCE occupied by the first physical layer signaling in PDCCH of the first sub frame of the first carrier, or an index of a first eCCE occupied by the first physical layer signaling in a corresponding EPDCCH-PRB-set.

The present disclosure discloses a user equipment, and the user equipment includes:

a first module, for detecting a first physical layer signaling for scheduling a first carrier on a first sub frame of the first carrier, and detecting a second physical layer signaling for scheduling the first carrier on a second sub frame of a second carrier;

wherein the first carrier is deployed on an unlicensed spectrum, the second serving cell is deployed on a licensed spectrum, the first sub frame and the second frame are two different sub frames, and for the user equipment, the first carrier can be self-scheduled and cross-carrier scheduled.

In one embodiment, the first module is further used for at least one of the following:

detecting a PCFICH on a first sub frame of the second carrier, so as to determine that the PCFICH does not exist; wherein the first sub frame is a sub frame except a sub frame set of ePDCCH detected by the UE on the second carrier; and receiving a downlink signaling, so as to determine to detect the first physical layer signaling on the first sub frame of the first carrier.

In another embodiment, the user equipment further includes:

a second module, for receiving a downlink physical layer data according to the first physical layer signaling; and a third module, for transmitting a HARQ_ACK for the downlink physical layer data on a serving cell belonged to the second carrier;

wherein the serving cell belonged to the second carrier is a primary cell, the first sub frame is a latest downlink sub frame in the downlink sub frame indicated by the HARQ_ACK, the UE detects and gets the first physical layer signaling in the first sub frame, a generating parameter of PUCCH resource occupied by the HARQ_ACK includes a first index; the first index is an index of a first CCE occupied by the first physical layer signaling in PDCCH of the first sub frame of the first carrier, or an index of a first eCCE occupied by the first physical layer signaling in a corresponding EPDCCH-PRB-set.

The present disclosure discloses a base station equipment, and the base station equipment includes:

a first module, for transmitting a first physical layer signaling for scheduling a first carrier on a first sub frame of the first carrier, and transmitting a second physical layer signaling for scheduling the first carrier on a second sub frame of a second carrier;

wherein the first carrier is deployed on an unlicensed spectrum, the second serving cell is deployed on a licensed spectrum, the first sub frame and the second frame are two different sub frames, target UEs of the first physical layer signaling and the second physical layer signaling are an identical UE, and for the UE, the first carrier can be self-scheduled and cross-carrier scheduled.

In one embodiment, the first module is further used for at least one of the following:

determining a zero transmitting power maintained on PCFICH of a first sub frame of the second carrier, wherein the first sub frame is a sub frame except a sub frame set of ePDCCH detected by the UE on the second carrier, and transmitting a downlink signaling, so as to indicate the target UE to detect the first physical layer signaling on the first sub frame of the first carrier.

The base station equipment further includes:

a second module, for receiving a downlink physical layer data according to the first physical layer signaling; and a third module, for transmitting a HARQ_ACK for the downlink physical layer data on a serving cell belonged to the second carrier;

wherein the serving cell belonged to the second carrier is a primary cell, the first sub frame is a latest downlink sub frame in the downlink sub frame indicated by the HARQ_ACK, a generating parameter of PUCCH resource occupied by the HARQ_ACK includes a first index; the first index is an index of a first CCE occupied by the first physical layer signaling in PDCCH of the first sub frame of the first carrier, or an index of a first eCCE occupied by the first physical layer signaling in a corresponding EPDCCH-PRB-set.

For a problem that the control signaling in the LAA is only transmitted on the PCC resulted in a part of sub frames on the SCC not be scheduled, the present disclosure provides a method and device adopting an unlicensed spectrum communication. The UE respectively detects the physical layer signalings on the PCC and the SCC in different sub frames, and schedules that the control signaling of the unlicensed carrier is preferentially transmitted on the licensed carrier. Only in the uplink sub frame of the licensed carrier or the sub frame of the PDCCH does not transmitted, the control signaling is transmitted on the licensed carrier. The present disclosure ensures the transmission quality of the physical layer signaling as much as possible and also ensure that all sub frames on the SCC may be scheduled. Additionally, the present disclosure reuses the CA scheme of the existing LTE as much as possible and thus has good compatibility.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
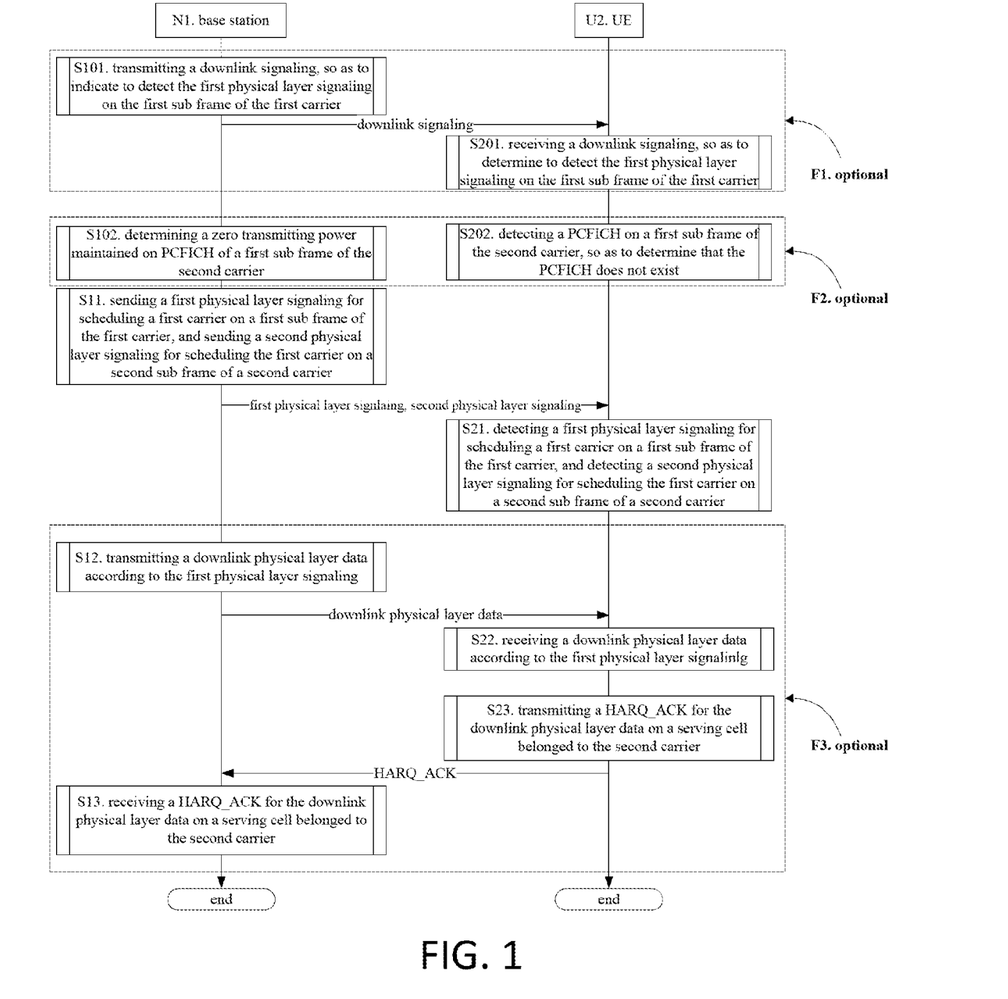
FIG. 1 is a flowchart for scheduling an unlicensed spectrum according to one embodiment of the present disclosure.

Embodiment I illustrates a flowchart for scheduling an unlicensed spectrum, as shown in FIG. 1. In FIG. 1, the base station N1 is a serving base station of UE U2.

For the base station N1, in step S11, the method involves transmitting a first physical layer signaling for scheduling a first carrier on a first sub frame of the first carrier, and transmitting a second physical layer signaling for scheduling the first carrier on a second sub frame of a second carrier.

For the UE U2, in step S21, the method involves detecting a first physical layer signaling for scheduling a first carrier on a first sub frame of the first carrier, and detecting a second physical layer signaling for scheduling the first carrier on a second sub frame of a second carrier.

In Embodiment I, the first carrier is deployed on an unlicensed spectrum, the second serving cell is deployed on a licensed spectrum, and the first sub frame and the second frame are two different sub frames. For the UE U2, the first carrier can be self-scheduled and cross-carrier scheduled.

In a first exemplary embodiment of Embodiment I, in step S101, the base station N1 transmits a downlink signaling, so as to indicate the target UE U1 to detect the first physical layer signaling on the first sub frame of the first carrier, and in step S201, the UE U1 receives a downlink signaling, so as to determine to detect the first physical layer signaling on the first sub frame of the first carrier. The downlink signaling is one of the following:

a SIB1 configured with a TDD frame structure of the second carrier, wherein the first sub frame corresponds to an uplink sub frame; and a physical layer signaling with the TDD frame structure of the second carrier identified by eIMTA-RNTI, wherein the first sub frame corresponds to the uplink sub frame;

a RRC signaling, which adopts a bitmap manner to configure whether the UE detects the first physical layer signaling in each sub frame of the first carrier, and subframePatternConfig-r11 IE (Information Element), which indicates ePDCCH (enhanced PDCCH) detecting sub frame set, and the first sub frame belongs to the ePDCCH detecting sub frame set.

In a second exemplary embodiment of Embodiment I, in step S102, the base station N1 determines a zero transmitting power maintained on PCFICH of a first sub frame of the second carrier, and in step S202, the UE U2 detects a PCFICH on a first sub frame of the second carrier, so as to determine that the PCFICH does not exist (i.e. the PDCCH does not exist). Wherein the first sub frame is a sub frame except a sub frame set (the sub frame set is configured by the RRC signaling) of the ePDCCH detected by the UE on the second carrier, i.e. the UE U2 does not detect ePDCCH on the first sub frame of the second carrier.

In a third exemplary embodiment of Embodiment I, the base station N1 transmits a downlink physical layer data according to the first physical layer signaling in step S12, and receives a HARQ_ACK for the downlink physical layer data on a serving cell belonged to the second carrier in step S13. The UE U2 receives a downlink physical layer data according to the first physical layer signaling in step S22, and transmitting a HARQ_ACK for the downlink physical layer data on a serving cell belonged to the second carrier in step S23.

In the third exemplary embodiment of Embodiment, the serving cell belonged to the second carrier is a primary cell, the first sub frame is a latest downlink sub frame in the downlink sub frame indicated by the HARQ_ACK, the UE U1 detects the first physical layer signaling in the first sub frame, and a generating parameter of PUCCH resource occupied by the HARQ_ACK includes a first index. The first index is an index of a first CCE occupied by the first physical layer signaling in PDCCH of the first sub frame of the first carrier, or an index of a first eCCE occupied by the first physical layer signaling in a corresponding EPDCCH-PRB-set.

Embodiment II

Figure 2:
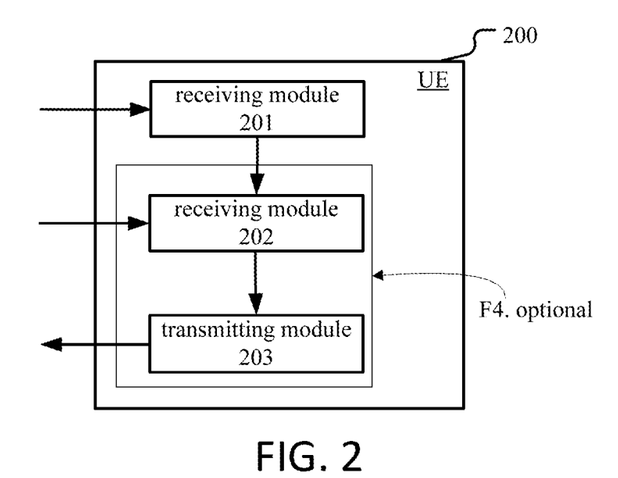
FIG. 2 is a structure diagram illustrating a processing device in a user equipment according to one embodiment of the present disclosure.

Embodiment II is a structure diagram illustrating a processing device in a user equipment, as shown in FIG. 2. In FIG. 2, the processing device 200 in the UE mainly includes a first receiving module 201, a second receiving module 202, and a first transmitting module 203, wherein the modules identified by a square frame F4 (i.e. the second receiving module 202 and the first transmitting module 203) are optional modules.

The first receiving module 201 is used for detecting a first physical layer signaling for scheduling a first carrier on a first sub frame of the first carrier, and detecting a second physical layer signaling for scheduling the first carrier on a second sub frame of a second carrier.

In Embodiment, the first carrier is deployed on an unlicensed spectrum, the second serving cell is deployed on a licensed spectrum, and the first sub frame and the second frame are two different sub frames. The physical layer signaling is DCI. For the user equipment, the first carrier can be self-scheduled and cross-carrier scheduled.

In a first exemplary embodiment of Embodiment, the first module 201 is used for one of the following:

detecting a PCFICH on a first sub frame of the second carrier, so as to determine that the PCFICH does not exist; wherein the first sub frame is a sub frame except a sub frame set of ePDCCH detected by the UE on the second carrier; and receiving a downlink signaling, so as to determine to detect the first physical layer signaling on the first sub frame of the first carrier.

In a second exemplary embodiment of Embodiment, the processing apparatus 200 of the UE further includes the second receiving module 202 and the first transmitting module 203. The second receiving module 202 is used for receiving a downlink physical layer data according to the first physical layer signaling, and the first transmitting module 203 is used for transmitting a HARQ_ACK for the downlink physical layer data on a serving cell belonged to the second carrier.

In the second exemplary embodiment of the Embodiment, the serving cell belonged to the second carrier is a primary cell, the first sub frame is a latest downlink sub frame in the downlink sub frame indicated by the HARQ_ACK, the first receiving module 201 detects the first physical layer signaling in the first sub frame, and a generating parameter of PUCCH resource occupied by the HARQ_ACK includes a first index. The first index is an index of a first CCE occupied by the first physical layer signaling in PDCCH of the first sub frame of the first carrier, or an index of a first eCCE occupied by the first physical layer signaling in a corresponding EPDCCH-PRB-set. The HARQ_ACK is transmitted by a PUCCH format 1b or a PUCCH format 1b selected by the channel.

Embodiment III

Figure 3:
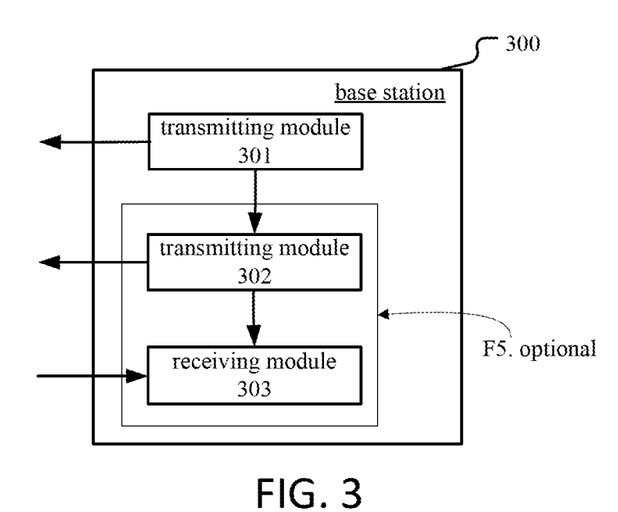
FIG. 3 is a structure diagram illustrating a processing device in a base station equipment according to one embodiment of the present disclosure.

Embodiment III is a structure diagram illustrating a processing device in a base station equipment, as shown in FIG. 3. In FIG. 3, the processing device 300 of the base station mainly includes a second transmitting module 301, a third transmitting module 302 and a third receiving module 303, wherein the modules identified by a square frame F5 (i.e. the third transmitting module 302 and the third receiving module 303) are optional modules.

The second transmitting module 301 is used for transmitting a first physical layer signaling for scheduling a first carrier on a first sub frame of the first carrier, and transmitting a second physical layer signaling for scheduling the first carrier on a second sub frame of a second carrier.

In Embodiment III, the first carrier is deployed on an unlicensed spectrum, the second serving cell is deployed on a licensed spectrum, the first sub frame and the second frame are two different sub frames, and target UEs of the first physical layer signaling and the second physical layer signaling are an identical UE. For the UE, the first carrier can be self-scheduled and cross-carrier scheduled.

In a first exemplary embodiment of Embodiment III, the second transmitting module 301 is further used for one of the following:

determining a zero transmitting power maintained on PCFICH of a first sub frame of the second carrier, wherein the first sub frame is a sub frame except a sub frame set of ePDCCH detected by the UE on the second carrier, and transmitting a downlink signaling, so as to indicate the target UE to detect the first physical layer signaling on the first sub frame of the first carrier.

In a second exemplary embodiment of Embodiment III, the processing apparatus 300 of the base station includes the third transmitting module 302 and the third receiving module 303. The third transmitting module 302 is used for receiving a downlink physical layer data according to the first physical layer signaling and the third receiving module 303 is used for transmitting a HARQ_ACK for the downlink physical layer data on a serving cell belonged to the second carrier.

In the second exemplary embodiment of Embodiment III, the serving cell belonged to the second carrier is a primary cell, the first sub frame is a latest downlink sub frame in the downlink sub frame indicated by the HARQ_ACK, and the PUCCH occupied by the HARQ_ACK is determined by the first index and the parameters of the higher layer configuration. The first index is an index of a first CCE occupied by the first physical layer signaling in PDCCH of the first sub frame of the first carrier, or an index of a first eCCE occupied by the first physical layer signaling in a corresponding EPDCCH-PRB-set.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present disclosure is not limited to any particular form of combination of software and hardware.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A method adopting an unlicensed spectrum communication in a UE, comprising the following step:
   step A: detecting a first physical layer signaling for scheduling a first carrier on a first sub frame of the first carrier, and detecting a second physical layer signaling for scheduling the first carrier on a second sub frame of a second carrier;
   step B: receiving a downlink physical layer data according to the first physical layer signaling; and
   step C: transmitting a HARQ_ACK for the downlink physical layer data on a serving cell belonged to the second carrier;
   wherein the first carrier is deployed on an unlicensed spectrum, the second serving cell is deployed on a licensed spectrum, the first sub frame and the second frame are two different sub frames, and for the UE, the first carrier is self-scheduled and cross-carrier scheduled;
   wherein the serving cell belonged to the second carrier is a primary cell, the first sub frame is a latest downlink sub frame in the downlink sub frame indicated by the HARQ_ACK, the UE detects and gets the first physical layer signaling in the first sub frame, a generating parameter of PUCCH resource occupied by the HARQ_ACK comprises a first index; the first index is an index of a first CCE occupied by the first physical layer signaling in PDCCH of the first sub frame of the first carrier, or an index of a first eCCE occupied by the first physical layer signaling in a corresponding EPDCCH-PRB-set.

2. The method adopting the unlicensed spectrum communication in the UE according to claim 1, wherein the step A further comprises the following step:
   step A0: receiving a downlink signaling, so as to determine to detect the first physical layer signaling on the first sub frame of the first carrier.

3. The method adopting the unlicensed spectrum communication in the UE according to claim 2, wherein the step A further comprises the following step:
   step A1: detecting a PCFICH on a first sub frame of the second carrier, so as to determine that the PCFICH does not exist;
   wherein the first sub frame is a sub frame except a sub frame set of ePDCCH detected by the UE on the second carrier.

4. A method adopting an unlicensed spectrum communication in a base station, comprising the following step:
   step A: transmitting a first physical layer signaling for scheduling a first carrier on a first sub frame of the first carrier, and transmitting a second physical layer signaling for scheduling the first carrier on a second sub frame of a second carrier;
   step B: transmitting a downlink physical layer data according to the first physical layer signaling; and
   step C: receiving a HARQ_ACK for the downlink physical layer data on a serving cell belonged to the second carrier;

wherein the first carrier is deployed on an unlicensed spectrum, the second serving cell is deployed on a licensed spectrum, the first sub frame and the second frame are two different sub frames, target UEs of the first physical layer signaling and the second physical layer signaling are an identical UE, and for the UE, the first carrier is self-scheduled and cross-carrier scheduled;

wherein the serving cell belonged to the second carrier is a primary cell, the first sub frame is a latest downlink sub frame in the downlink sub frame indicated by the HARQ_ACK, a generating parameter of PUCCH resource occupied by the HARQ_ACK comprises a first index; the first index is an index of a first CCE occupied by the first physical layer signaling in PDCCH of the first sub frame of the first carrier, or an index of a first eCCE occupied by the first physical layer signaling in a corresponding EPDCCH-PRB-set.

5. The method adopting the unlicensed spectrum communication in the base station according to claim 4, wherein the step A further the following step:

step A0: transmitting a downlink signaling, so as to indicate the target UE to detect the first physical layer signaling on the first sub frame of the first carrier.

6. The method adopting the unlicensed spectrum communication in the base station according to claim 4, wherein the step A further comprises the following step:

step A1: determining a zero transmitting power maintained on PCFICH of a first sub frame of the second carrier;

wherein the first sub frame is a sub frame except a sub frame set of ePDCCH detected by the UE on the second carrier.

7. A user equipment, comprising:

a first module, for detecting a first physical layer signaling for scheduling a first carrier on a first sub frame of the first carrier, and detecting a second physical layer signaling for scheduling the first carrier on a second sub frame of a second carrier;

a second module, for receiving a downlink physical layer data according to the first physical layer signaling; and a third module, for transmitting a HARQ_ACK for the downlink physical layer data on a serving cell belonged to the second carrier;

wherein the first carrier is deployed on an unlicensed spectrum, the second serving cell is deployed on a licensed spectrum, the first sub frame and the second frame are two different sub frames, and for the user equipment, the first carrier is self-scheduled and cross-carrier scheduled;

wherein the serving cell belonged to the second carrier is a primary cell, the first sub frame is a latest downlink sub frame in the downlink sub frame indicated by the HARQ_ACK, the UE detects and gets the first physical layer signaling in the first sub frame, a generating parameter of PUCCH resource occupied by the HARQ_ACK comprises a first index; the first index is an index of a first CCE occupied by the first physical layer signaling in PDCCH of the first sub frame of the first carrier, or an index of a first eCCE occupied by the first physical layer signaling in a corresponding EPDCCH-PRB-set.

8. The user equipment according to claim 7, wherein the first module is further used for at least one of the following:

detecting a PCFICH on a first sub frame of the second carrier, so as to determine that the PCFICH does not exist; wherein the first sub frame is a sub frame except a sub frame set of ePDCCH detected by the UE on the second carrier; and receiving a downlink signaling, so as to determine to detect the first physical layer signaling on the first sub frame of the first carrier.

9. A base station equipment, comprising:

a first module, for transmitting a first physical layer signaling for scheduling a first carrier on a first sub frame of the first carrier, and transmitting a second physical layer signaling for scheduling the first carrier on a second sub frame of a second carrier;

a second module, for receiving a downlink physical layer data according to the first physical layer signaling; and a third module, for transmitting a HARQ_ACK for the downlink physical layer data on a serving cell belonged to the second carrier;

wherein the first carrier is deployed on an unlicensed spectrum, the second serving cell is deployed on a licensed spectrum, the first sub frame and the second frame are two different sub frames, target UEs of the first physical layer signaling and the second physical layer signaling are an identical UE, and for the UE, the first carrier is self-scheduled and cross-carrier scheduled;

wherein the serving cell belonged to the second carrier is a primary cell, the first sub frame is a latest downlink sub frame in the downlink sub frame indicated by the HARQ_ACK, a generating parameter of PUCCH resource occupied by the HARQ_ACK comprises a first index; the first index is an index of a first CCE occupied by the first physical layer signaling in PDCCH of the first sub frame of the first carrier, or an index of a first eCCE occupied by the first physical layer signaling in a corresponding EPDCCH-PRB-set.

10. The base station equipment according to claim 9, wherein the first module is further used for at least one of the following:

determining a zero transmitting power maintained on PCFICH of a first sub frame of the second carrier; wherein the first sub frame is a sub frame except a sub frame set of ePDCCH detected by the UE on the second carrier; and transmitting a downlink signaling, so as to indicate the target UE to detect the first physical layer signaling on the first sub frame of the first carrier.

* * * * *

UNITED STATES PATENT AND TRADEMARK OFFICE
CERTIFICATE OF CORRECTION

PATENT NO. : 9,918,332 B2
APPLICATION NO. : 15/501732
DATED : March 13, 2018
INVENTOR(S) : Zhang et al.

It is certified that error appears in the above-identified patent and that said Letters Patent is hereby corrected as shown below:

In the Claims

Claim 1, Column 10, Line 24, after the word "the", delete "second".
Claim 1, Column 10, Line 34, before the word "PUCCH", add "a".
Claim 1, Column 10, Line 37, before the word "PDCCH", add "a".

Claim 4, Column 11, Line 2, after the word "the", delete "second".
Claim 4, Column 11, Line 12, before the word "PUCCH", add "a".
Claim 4, Column 11, Line 16, before the word "PDCCH", add "a".

Claim 7, Column 11, Line 46, after the word "the", delete "second".
Claim 7, Column 11, Line 56, before the word "PUCCH", add "a".
Claim 7, Column 12, Line 2, before the word "PDCCH", add "a".

Claim 9, Column 12, Line 28, after the word "the", delete "second".
Claim 9, Column 12, Line 38, before the word "PUCCH", add "a".
Claim 9, Column 12, Line 42, before the word "PDCCH", add "a".

Signed and Sealed this
Twenty-second Day of September, 2020

Andrei Iancu
*Director of the United States Patent and Trademark Office*